United States Patent
Edgington (10) Patent No.: US 11,349,827 B2
(45) Date of Patent: May 31, 2022

(54) ANONYMOUS ATTESTATION (71) Applicant: TRUSTONIC LIMITED, Cambridge (GB)

(72) Inventor: Alec Milne Edgington, Cambridge (GB)

(73) Assignee: TRUSTONIC LIMITED, Cambridge (GB)

( * ) Notice: Subject to any disclaimer, the term of this patent is extended or adjusted under 35 U.S.C. 154(b) by 176 days.

(21) Appl. No.: 16/486,898

(22) PCT Filed: Jan. 12, 2018

(86) PCT No.: PCT/GB2018/050084
§ 371 (c)(1),
(2) Date: Aug. 19, 2019

(87) PCT Pub. No.: WO2018/150154
PCT Pub. Date: Aug. 23, 2018

(65) Prior Publication Data
US 2020/0287890 A1 Sep. 10, 2020

(30) Foreign Application Priority Data
Feb. 20, 2017 (GB) .................................... 1702722

(51) Int. Cl.
*G06F 21/44* (2013.01)
*H04L 9/30* (2006.01)
(Continued)

(52) U.S. Cl.
CPC .......... *H04L 63/0823* (2013.01); *G06F 21/44* (2013.01); *H04L 9/3066* (2013.01);
(Continued)

(58) Field of Classification Search
None
See application file for complete search history.

(56) References Cited

U.S. PATENT DOCUMENTS 8,874,900 B2 * 10/2014 Brickell ................ H04L 9/3234
713/155
9,608,993 B1 * 3/2017 Camenisch ......... H04W 12/082
(Continued)

OTHER PUBLICATIONS

Yang, Li et al., "A delegation based cross trusted domain direct anonymous attestation scheme", Computer Networks 81 (2015) pp. 245-257. (Year: 2015).*

(Continued)

*Primary Examiner* — Michael Pyzocha
(74) *Attorney, Agent, or Firm* — Nixon & Vanderhye P.C.

(57) ABSTRACT

An anonymous attestation cryptographic protocol is provided for enabling a target (device 4) to attest to a predetermined property of the device without needing to reveal its identity to a verifier (8). When obtaining a credential from an issuer (6) to attest to the predetermined property, the credential is validated by an intermediary device (2) which is a separate consumer electronics device to the target device (4) itself. This allows the relatively processor-intensive calculations required for validating the credential to be performed on a separate device (2) from the device (4) for which the attestation has been made, allowing anonymous attestation protocols to be used for lower powered target devices such as sensors in the internet of things.

9 Claims, 4 Drawing Sheets (51) Int. Cl.
*H04L 9/32* (2006.01)
*H04L 9/40* (2022.01)

(52) U.S. Cl.
CPC ........ *H04L 9/3218* (2013.01); *H04L 2209/42* (2013.01); *H04L 2209/805* (2013.01)

(56) References Cited

U.S. PATENT DOCUMENTS

| | | | |
|---|---|---|---|
| 2005/0216736 A1* | 9/2005 | Smith | H04L 63/0823 713/168 |
| 2006/0010079 A1* | 1/2006 | Brickell | G06Q 20/3674 705/67 |
| 2007/0244833 A1* | 10/2007 | Camenisch | G06F 21/57 705/71 |
| 2007/0245138 A1* | 10/2007 | Camenisch | G06F 21/64 713/156 |
| 2009/0210716 A1 | 8/2009 | Chen | |
| 2012/0278628 A1* | 11/2012 | Chen | H04L 9/0863 713/176 |
| 2014/0006776 A1* | 1/2014 | Scott-Nash | G06F 21/57 713/156 |
| 2014/0095883 A1* | 4/2014 | Kirillov | H04L 9/3247 713/176 |
| 2014/0173274 A1* | 6/2014 | Chen | G06F 21/64 713/155 |
| 2014/0205090 A1* | 7/2014 | Li | H04L 9/3252 380/44 |
| 2018/0006822 A1* | 1/2018 | Brickell | H04L 9/088 |

OTHER PUBLICATIONS

D. Bernhard et al., "Anonymous attestation with user-controlled linkability", International Journal of Information Security (DIS), Springer, Heidelberg, DE, vol. 12, No. 3, Feb. 23, 2013, pp. 219-249.
International Search Report and Written Opinion of the ISA for PCT/GB2018/050084 dated Feb. 26, 2018, 15 pages.
Office Action for IN Application No. 201937034715 dated Jul. 6, 2021, 5 pages.

* cited by examiner

ANONYMOUS ATTESTATION

This application is the U.S. national phase of International Application No. PCT/GB2018/050084 filed Jan. 12, 2018 which designated the U.S. and claims priority to GB 1702722.8 filed Feb. 20, 2017, the entire contents of each of which are hereby incorporated by reference.

The present technique relates to the field of data processing. More particularly, it relates to anonymous attestation cryptographic protocols.

Increasingly, electronic devices are being used to access services which may involve handling of potentially sensitive information, such as mobile banking, access to healthcare services or handling of employment details. To give both the user and the service provider confidence that any sensitive data is being handled securely, the service provider may require the user's device to demonstrate that it meets certain properties in order to continue accessing the service. For example, the service provider may require that the user's device is running the latest version of the application software to ensure that any previously patched security vulnerabilities are no longer present, or could require that the user's device was manufactured in a particular factory or by certain trusted manufacturers, or that it has a particular hardware configuration (e.g. the presence of a trusted execution environment or other security mechanism at the platform level) which enables the service provider to trust the device.

Hence, for a variety of reasons a given device may need to be able to attest to an external verifier that it has some predetermined property. Cryptographic protocols may be established for enabling such remote attestation. For example, the target device making the attestation may sign a message using its private key, and the signed message may be transmitted to the verifier. The verifier may be provided with the device's public key corresponding to the private key, and can then verify the message signature using the public key to check that the device is a trusted device known to have the predetermined property for which the attestation is made. However, a problem with this approach is that the target device has to provide its public key to the verifier and therefore makes the verifier aware of the device's identity. This may be undesirable in some scenarios where user anonymity may be important. For example, if the same device is being used to interact with multiple verifiers (e.g. a healthcare provider and the user's employer), providing the device's public key to both verifiers could allow the verifiers to determine that they are interacting with the same user, which may be undesirable for privacy reasons.

To address this, anonymous attestation cryptographic protocols are available which enable a target device to attest to the fact that it meets a certain predetermined property without revealing its identity to the verifier. Typically, such protocols use a join phase in which the target device requests authentication from an issuer service separate from the verifier, and when the device is successfully authenticated by the issuer then the issuer may issue a credential which can be stored on the device. In a verify phase, when the target device wishes to access a service associated with a particular verifier, they can use the credential issued by the issuer to attest to the verifier that the target device has the predetermined property, without needing to reveal the target device's identity to the verifier. The verifier can check based on information provided by the issuer whether the credential is valid.

At least some examples provide a method for obtaining a credential for attesting to a predetermined property of a target device according to an anonymous attestation cryptographic protocol; the method comprising:

requesting authentication of the target device by an issuer in dependence on secret information held by the target device;

receiving, at an intermediary device, the credential provided by the issuer when the authentication is successful, wherein the intermediary device is a separate consumer electronics device to the target device; and validating the credential at the intermediary device according to the anonymous attestation cryptographic protocol.

At least some examples provide a system comprising:

a target device to store secret information for authenticating the target device to an issuer; and an intermediary device to receive from the issuer a credential for attesting that the issuer has authenticated the target device as having a predetermined property, and to validate the credential according to an anonymous attestation cryptographic protocol;

wherein the intermediary device is a separate consumer electronics device to the target device.

At least some examples provide an intermediary device comprising:

communication circuitry to receive from an issuer a credential for attesting that the issuer has authenticated a target device as having a predetermined property according to an anonymous attestation cryptographic protocol, wherein the target device is a separate consumer electronics device to the intermediary device;

processing circuitry to validate the credential received from the issuer according to the anonymous attestation cryptographic protocol; and storage circuitry to store the credential when validated.

At least some examples provide a method comprising:

receiving at an intermediary device from an issuer a credential for attesting that the issuer has authenticated a target device as having a predetermined property according to an anonymous attestation cryptographic protocol, wherein the target device is a separate consumer electronics device to the intermediary device;

validating the credential received from the issuer according to the anonymous attestation cryptographic protocol at the intermediary device; and storing the credential at the intermediary device when validated.

At least some examples provide a target device comprising:

communication circuitry to request that an intermediary device transmits to the target device credential information for attesting that an issuer has authenticated the target device as having a predetermined property according to an anonymous attestation cryptographic protocol, wherein the intermediary device is a separate consumer electronics device to the target device; and processing circuitry configured to generate, in dependence on the credential information transmitted from the intermediary device, an attestation message for transmission to a verifier to attest to the verifier that said target device has said predetermined property.

At least some examples provide a method comprising:

requesting that an intermediary device transmits to a target device credential information for attesting that an issuer has authenticated the target device as having a predetermined property using secret information held by the target device according to an anonymous attestation cryptographic protocol, wherein the intermediary device is a separate consumer electronics device to the target device; and generating, in dependence on the credential information transmitted from the intermediary device, an attestation message for transmission to a verifier to attest to the verifier that said target device has said predetermined property.

Further aspects, features and advantages of the present technique will be apparent from the following description of examples, which is to be read in conjunction with the accompanying drawings, in which:

Since the credential issued by the issuer is relied on by the verifier to establish that the target device has the required property, an anonymous attestation cryptographic protocol typically includes a step of validating the credential, for example to ensure that the credential has been issued by a trusted issuer. The credential validation processing can be relatively computationally expensive. However, with the advent of the Internet of Things, devices which may require remote attestation may be extremely low power devices for which the processing cost of handling such credential validation may be prohibitively expensive. This has typically limited the use of anonymous attestation cryptographic protocols to relatively large devices.

The inventor recognised that in practice, the portions of the anonymous attestation cryptographic protocols which rely on secret information held by the target device itself can be relatively inexpensive in terms of processing resource, while the portions which involve the processor-intensive work for validating the credential received from the issuer do not generally require knowledge of secret information held by the target device. Therefore, it is possible to separate different parts of the protocol so that the computationally-expensive parts can be delegated to an intermediary device which is a separate consumer electronics device to the target device itself, without compromising the security by leaking the secret information outside the target device. Hence, once authentication of the target device based on secret information held by the target device is successful, when the issuer issues the credential for attesting to a predetermined property of the target device, this can be sent to the intermediary device which may validate the credential according to the anonymous attestation cryptographic protocol. Hence, the computational burden on the target device itself is reduced and so smaller devices such as Internet of Things sensors or actuators can use the anonymous attestation cryptographic protocol.

In some examples, once the credential is validated it could then be sent to the target device which may itself store the credential. However, to further reduce the overhead at the target device it is possible for the intermediary device to store the credential once validated to reduce the cost of maintaining sufficient data storage for credentials at the target device.

The intermediary device could be shared between a number of different target devices, and so may maintain a database of credentials for attesting to properties of the different target devices. For example a number of devices within the same home or office, or held by the same user, could have their credentials managed in common by the same intermediary device. By consolidating credential validation and management operations onto the intermediary device it is not necessary for each separate target device to duplicate this functionality, allowing lower power, more area efficient, target devices. In a similar way, a single intermediary device may also manage credentials issued by a number of different issuers.

During a subsequent verification phase, the credential, or information derived from the credential, may be used by the target device to generate an attestation message which is transmitted to a verifier to attest to the verifier that the target device has the predetermined property. If the credential is being stored by the intermediary device, then on requesting verification the target device may request the credential or information derived from the credential to be transmitted to the target device from the intermediary so that it can generate the attestation message.

The intermediary device may be any consumer electronics device which is separate from the target device. The intermediary device may often have greater processing resource than the target device, although this is not essential and there is nothing preventing an intermediary device with the same or less processing resource than the target device being used. Even if the intermediary does not have more processing resource available than the target device, it can still be useful to consolidate credential management from a number of different target devices onto a single intermediary. Nevertheless, the present technique is particularly useful where the target device has insufficient processing resource available for handling the credential validation and this can be delegated to an intermediary with greater processing resource.

The target and intermediary devices may be any separate consumer electronics devices as viewed by a consumer. For example, consumer electronics devices may include mobile telephones or tablet computers, televisions, media players such as DVD players, music players such as stereo systems or portable music players, laptops or personal computers, processing devices integrated within household appliances such as refrigerators, washing machines or dishwashers, or smaller scale devices within the Internet of Things such as temperature sensors, sensors for sensing various healthcare parameters associated with a user, actuators for triggering some action such as opening a door or window, turning on lights, or controlling a heating or air conditioning system, for example. In general, the target device may have a separate housing from the intermediary device. Hence, from the point of view of the user the target device and the intermediary device are two separate electronic devices, rather than one of them being a subcomponent connected to an internal bus of the other device.

The technique can be used for any anonymous attestation cryptographic protocol, which may refer to any cryptographic protocol in which the target device is able to attest to some predetermined property to a verifier without revealing its identity to the verifier. Note that the anonymous attestation cryptographic protocol does not imply that the target device must remain anonymous to all parties, in particular the authentication with the issuer may require the target device's identity to be known to the issuer. Hence, the anonymity is from the point of view of the verifier. Also, it is possible in some anonymous attestation cryptographic protocols for different levels of anonymity to be permitted so that while the verifier may not be aware of the individual target device's identity, the verifier may still be informed of the fact that the target device is a member of some group of target devices so that the verifier can partially identify the target device even if the verifier does not know exactly which particular individual device it is communicating with.

Also, anonymous attestation does not exclude the ability for the verifier to determine when it is communicating with the same device it has already communicated with, and so the anonymous attestation may permit a user identifier associated with the target device being provided to the verifier, however the verifier cannot attribute this identifier to any particular target device in order to identify the target device's true identity. The user identifier may for example be an identifier allocated to the device by the verifier when the device first accesses the service, but which does not enable identification of whether the target device has the property being attested to and cannot be correlated with identifiers exchanged with other verifiers. That is, when communicating with two different verifier services, the same target device may provide two different user identifiers to the respective service providers to identify the user sufficiently for the purposes of using that service, without revealing the device's actual identity as represented by cryptographic keys associated with the target device.

While the present technique can be used for any anonymous attestation cryptographic protocol, it is particularly useful for protocols where the validation of the credential includes at least one elliptic curve pairing computation or comparison. In practice, some protocols may require several such elliptic curve pairing computations or comparisons. Protocols based on elliptic curve cryptographic methods tend to provide a greater level of security for a given number of bits of a cryptographic key than alternative techniques such as RSA, however these pairings are computationally expensive and this tends to be prohibitive when used in a relatively low power device. The protocol may include full elliptic-curve pairing computations, or in some cases may perform a comparison which does not actually compute the pairing values but compares two pairings for equality. With the technique discussed above the elliptic curve pairing computations or comparisons can be offloaded to the intermediary device so that a target device with insufficient processing resource for carrying out such computations can still make use of an anonymous attestation cryptographic protocol.

A range of anonymous attestation cryptographic protocols can be used. In some examples the anonymous attestation protocol is a Direct Anonymous Attestation (DAA) protocol.

An intermediary device may comprise communication circuitry for receiving from an issuer a credential for attesting that the issuer has authenticated a target device as having a predetermined property according to an anonymous attestation cryptographic protocol. The target device is a separate consumer electronics device to the intermediary device. The intermediary device may have processing circuitry for validating the credential received from the issuer according to the anonymous attestation cryptographic protocol, and storage circuitry for storing the credential when validated. On request from the target device, the communication circuitry may transmit either the credential itself or a derivative of the credential to the target device which can then use the credential for generating its attestation messages. The storage circuitry of the intermediary may store credentials for a number of different target devices.

Similarly, a target device suitable for implementing the above techniques may have communication circuitry for requesting that the intermediary device transmits the credential or the derivative of the credential for attesting that the issuer has authenticated the target devices having a given property according to the anonymous attestation cryptographic protocol, where the intermediary device is a separate consumer electronics device to the target device. The target device may have a processing circuitry which generates, in dependence on the credential information transmitted from the intermediary device, an attestation message for transmitting to a verifier to attest to the verifier that the target device has the predetermined property. Note that the attestation message may also contain other information, such as an identifying key of the target device (which may be a service specific key rather than one that identifies the devices true identity), or application-specific information associated with the particular service being accessed, e.g. banking information, healthcare related information etc. In addition to the communication circuitry and the processing circuitry, the target device may also have storage circuitry to store secret information which can be used by the processing circuitry to generate an authentication message for requesting authentication of the target device by the issuer. This secret information used by the issuer to determine whether the target device meets the required property does not need to be revealed to the verifier when generating the attestation message because the credential received from the issuer is enough for the verifier to determine that the property is satisfied.

The technique may also be implemented using a computer program which may control a data processing apparatus to perform any of the methods discussed in this application. The computer program may be stored in a storage medium. The storage medium may be a non-transitory storage medium. Separate programs may be written for the target device and the intermediary device respectively to control the corresponding methods performed at each device.

Figure 1:
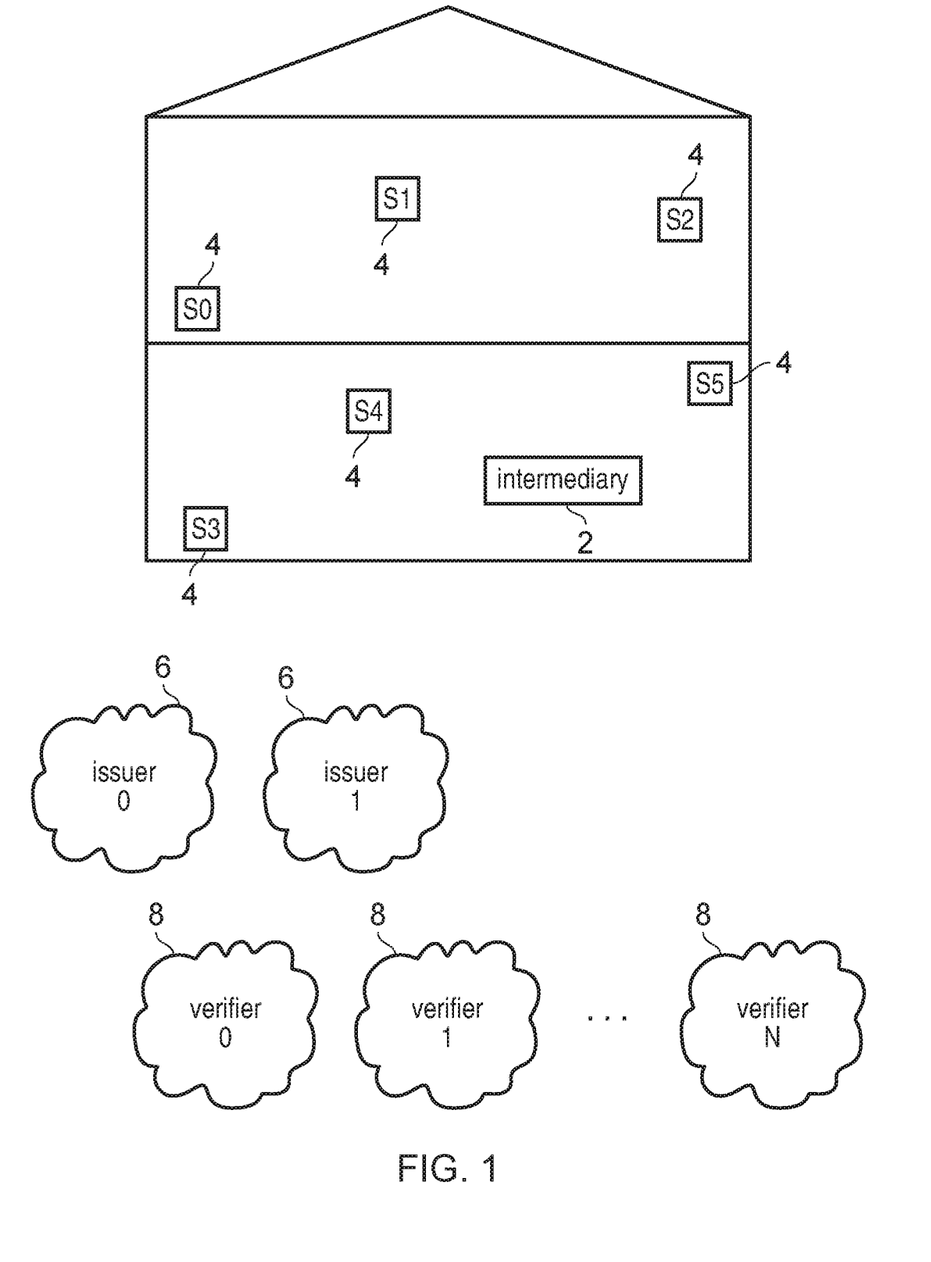
FIG. 1 schematically illustrates a system comprising an intermediary device and a number of target devices which can delegate processing of anonymous attestation credentials to the intermediary device.

FIG. 1 shows an example system comprising an intermediary device 2 and a number of target devices 4 for which anonymous attestation credentials are managed by the intermediary device 2. The intermediary device 2 may, for example, be a smartphone, tablet computer or personal computer, while the target devices 4 may be various smaller lower power devices, such as sensors or actuators associated with various objects or devices around the home according to the Internet of Things. It will be appreciated that this is just one example of a possible scenario in which the described techniques can be used and in general any target device 4 may delegate credential management for anonymous attestation to a separate intermediary device 2 which is a separate consumer electronics device to the target device.

As shown in FIG. 1, the target devices 4 and intermediary device 2 may interact with a number of service providers which may be implemented on servers within the cloud. For example, there may be a number of anonymous attestation credential issuers 6 from which a given target device can request a credential to attest to the fact that the target device 4 has given property, such as running a particular version of software, having a particular hardware infrastructure which meets certain requirements, or having been manufactured in a certain factory or by a particular manufacturing process for example. For example, the target device 4 may store keys injected during manufacturing or installed alongside software on the device to attest to those particular properties of the device, which can then be used to sign messages which can be verified by the issuer 6 to establish whether the device meets the required property. The issuer 6 issues a credential when the device has been successfully authenticated. The intermediary device 2 can also be in communication with the issuer services 6 in order to receive the credentials and process these on behalf of the target devices 4. The target devices 4 and/or the intermediary 2 can also be in communication with various verifier services 8, which may for example be operated by application service providers to handle applications such as mobile banking, healthcare provision, or employment-related information, or any other remote service which the target devices 4 may need to access in order to upload data to the service or access data from the service. While FIG. 1 shows a single intermediary device 2 shared between all the target devices 4 it will be appreciated that in some cases there may be multiple intermediary devices 2 which each handle a subset of the target devices 4.

Figure 2:
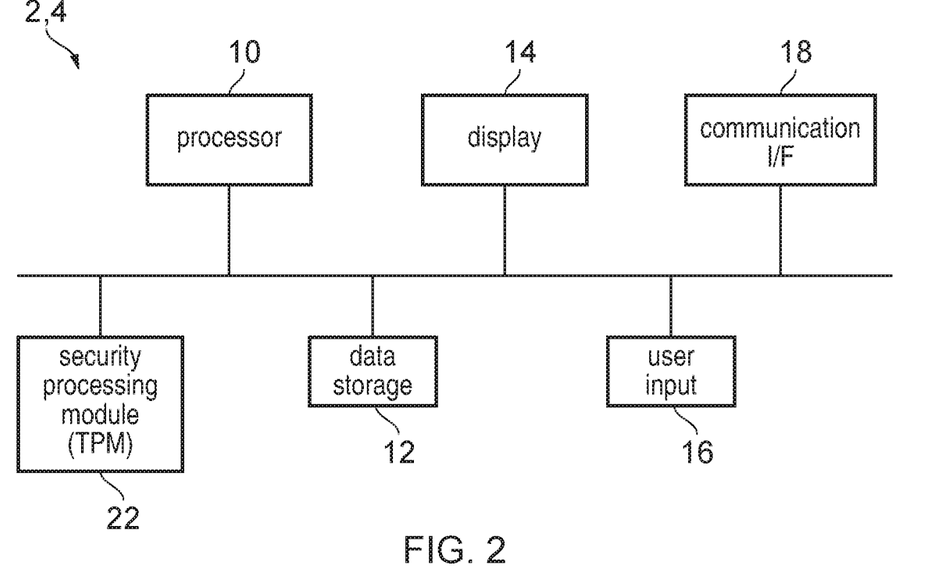
FIG. 2 schematically illustrates an example of components of the intermediary device or target device.

FIG. 2 shows an example of the hardware configuration of the intermediary device 2 or the target device 4. For example the intermediary device 2 may have a processor 10 for performing data processing, data storage (e.g. memory) 12 for storing data to be processed and software to be executed by the processor 10, a display 14, a user interface module 16 for receiving input from the user, and a communication interface 18 for communicating with external devices such as the target devices 4 or network connected devices such as the servers associated with the issuer 6 or verifiers 8. Optionally, as shown in FIG. 2, the intermediary device 2 may also have a security processing module 22 connected to the processor 10 via an internal bus, for handling certain secure processing operations. For example the security processing module could be a trusted platform module (TPM) which isolates certain secure functions from the general purpose functions performed by the processor 10. The target devices 4 may have a similar configuration to the intermediary device 2. In the target devices 4, the processor 10 may have less processing resource that the processor in the intermediary device 2, for example the target device 4 may have a processor which is capable of processing instructions with a lower maximum throughput than the intermediary device 2. Some target devices 4 may not have all the components shown in FIG. 2. For example, some target devices 4 may simply be a sensor for gathering data and transmitting it to an external device and so may not need a display 14 or user input interface 16. It will be appreciated that FIG. 2 is just one example of a possible hardware configuration and many other components could also be provided within the devices.

Figure 3:
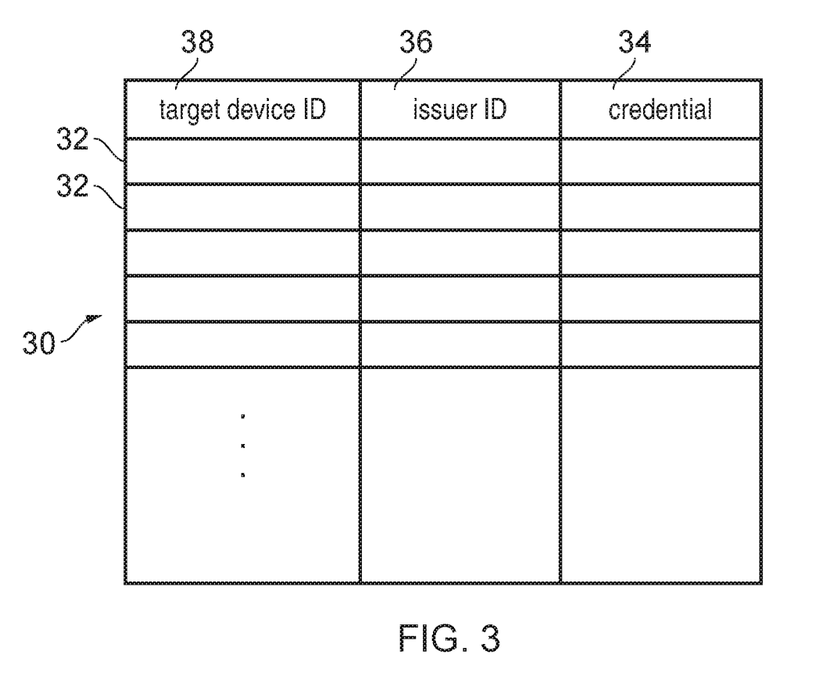
FIG. 3 shows an example of a database of credentials maintained by the intermediary device.

As shown in FIG. 3, the intermediary device may maintain a database 30 of anonymous attestation credentials received from various issuers 6 for the different target devices 4 managed by that intermediary. For example the database may include a number of credential entries 32 each providing a particular credential 34 received from an issuer, which may be stored in association with an issuer identifier 36 identifying the issuer which provided the credential and a target device identifier 38 which identifies the particular device for which the credential is issued to attest to a property of that device. It will be appreciated that other information could also be stored by the intermediary 2 within the database 30 for each credential. The credential may depend on some secret information held by the target device 4 (e.g. a diversified version of a random seed held by the target device), so that different target devices receive different credentials.

The anonymous attestation cryptographic protocol includes a join phase when the issuer authenticates the target device to check it meets the required property and issues a credential if the device is authenticated, and a verify phase when the target device uses the credential to attest to the verifier that it meets the required property.

Figure 4:
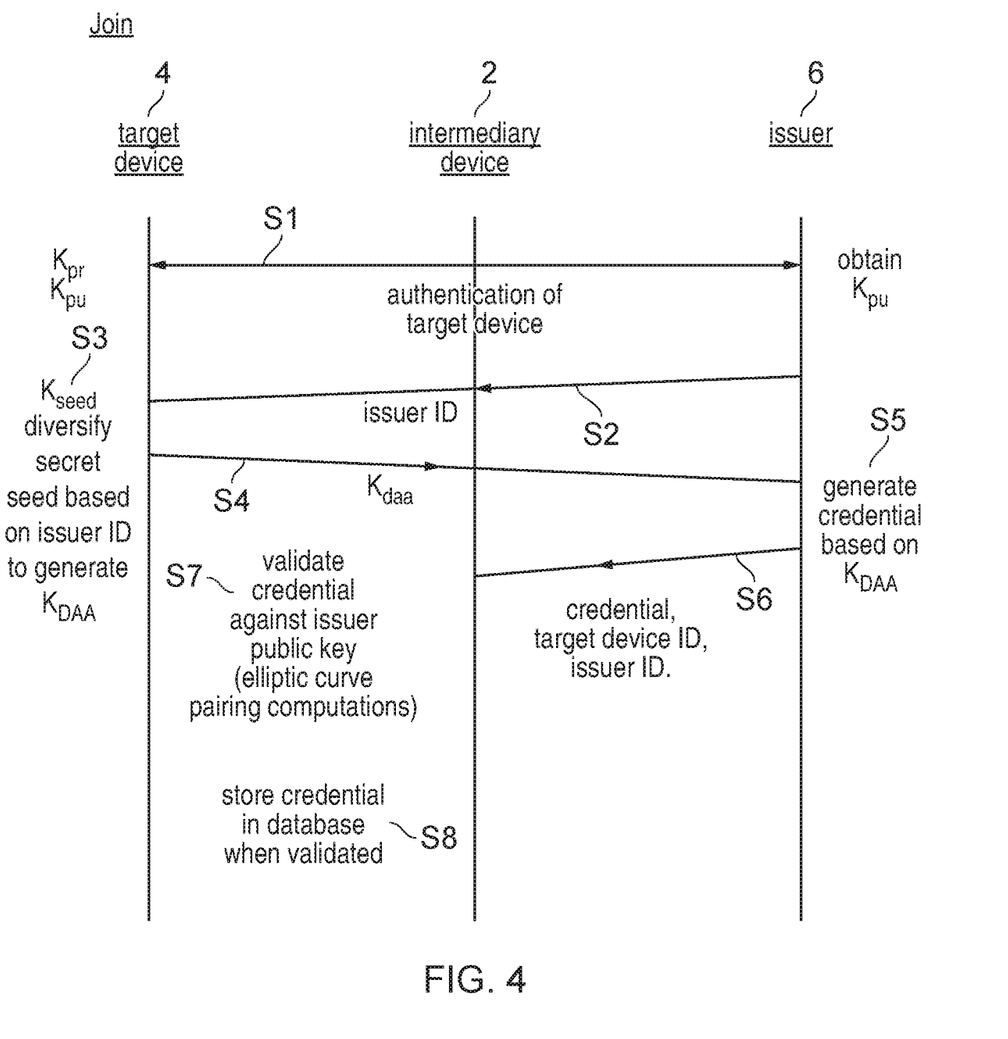
FIG. 4 is a signalling diagram showing a method of obtaining a credential from an issuer for attesting to a particular property of the target device.

FIG. 4 shows an example of a method of processing in the join phase. FIG. 4 shows signals exchanged by the target device 4, the intermediary device 2 and the issuer 6. At step S1 the target device 4 and issuer 6 perform an authentication process for the issuer 6 to authenticate the identity of the target device 4 to verify that it does meet the property for which the credential is to be issued. This authentication step S1 may be performed according to any known cryptographic protocol. For example the authentication could use a public-private key infrastructure where the target device 4 has a private key $K_{pr}$ and a corresponding public key $K_{pu}$ and can sign a message sent to the issuer 6 using its private key $K_{pr}$. The issuer can obtain the target device's public key $K_{pu}$ (e.g., the key can be obtained from a key certifying authority responsible for managing certificates and other cryptographic information for establishing device identities). The issuer 6 verifies the signature using the obtained public key $K_{pu}$ to check that the target device is the device having the proper identity associated with the public key $K_{pu}$. Hence, in this part of the protocol the actual identity of the target device 4 is known to the issuer 6. If the target device 4 is not correctly authenticated at step S1, the process is halted.

Having authenticated the target device to identify that it does have the predetermined property to be attested, the issuer 6 provides an issuer identifier (ID) to the target device at step S2. At step S3 the target device 4 accesses secret information (e.g. a random number acting as a seed, $K_{seed}$) and diversifies the secret based on the issuer ID to generate a public anonymous attestation key $K_{daa}$ which is used for the purpose of the anonymous attestation protocol. The issuer ID can also be provided to the intermediary device 2 and forwarded to the target device 4, or generated by the intermediary device 2 instead of being received from the issuer 6. In some cases, at step S2 in addition to the issuer ID, there may also be other data generated by either the issuer 2 or the intermediary device 6 or both, which is provided to the target device 4 for diversification of the device-bound secret $K_{seed}$ to form $K_{daa}$. The anonymous attestation key $K_{daa}$ is transmitted to the issuer 6 at step S4. The anonymous attestation key $K_{daa}$ is different to the device's public key $K_{pu}$ used to identify the device itself. The anonymous attestation key $K_{daa}$ may be specific to the issuer 6 and also specific to a particular service if desired (for example the issuer 6 could provide a service ID alongside the issuer ID at step S2), and enables the issuer 6 to generate a bespoke credential for a particular device at step S5 which does not give away the actual identity of the device as represented by the device's public key $K_{pu}$. Nevertheless, by using a random seed to generate the key it is ensured that different devices receive different credentials so that one device cannot simply copy the credential used by another device to circumvent the protocol. Unlike the device public key $K_{pu}$, for the anonymous attestation key $K_{daa}$ a certificate for verifying the device identity based on the key $K_{daa}$ may not be publicly available.

At step S6 the issuer 6 transmits the credential to the intermediary device 2 alongside a device ID associated with the target device 4 and the issuer ID associated with the issuer ID 6. Alternatively, the device ID and issuer ID could be generated by the intermediary device. The device ID could be the anonymous attestation public key $K_{daa}$, or could be a separate ID which the device 4 may have provided to the issuer 6. At step S7 the intermediary device 2 validates the credential provided by the issuer 6 against the issuer's public key. The validation may include elliptic curve pairing computations. When the credential has been validated so that it is confirmed that the party providing the credential is the valid issuer 6, the credential is stored in the database 30 at step S8 of FIG. 4. The credential is stored alongside the device ID and issuer ID.

While FIG. 4 shows an example with a separate authentication step S1 from the step S4 of transmitting the authentication attestation message to the issuer 6, it is possible for these steps to be combined so that for example the authentication of the target device 4 by the issuer 6 may be implemented instead by the target device 4 signing the message transmitted at step S4 based on its private key $K_{pr}$ which can then be verified by the issuer 6. Hence it is not necessary to provide a separate authentication process from the process for providing $K_{daa}$ to the issuer 6. However, some embodiments may prefer to separate the authentication so that the issuer ID S2 is not transmitted to the target device 4 unless the authentication has already been successful.

FIG. 4 shows an example where the target device 4 communicates directly with the issuer 6 at steps S1, S2, S4. However it is also possible for communications between the target device 4 and the issuer 6 to pass via the intermediary device 2 so that the target device 4 only communicates locally with the intermediary device 2 and the issuer 6 communicates directly with intermediary device 2. Hence, the intermediary device 2 can either act as an intermediary between the target device 4 and the external issuer server 6, relaying messages between them, or could simply be an assistant to the target device 4 which provides a trusted computational offload facility.

Figure 5:
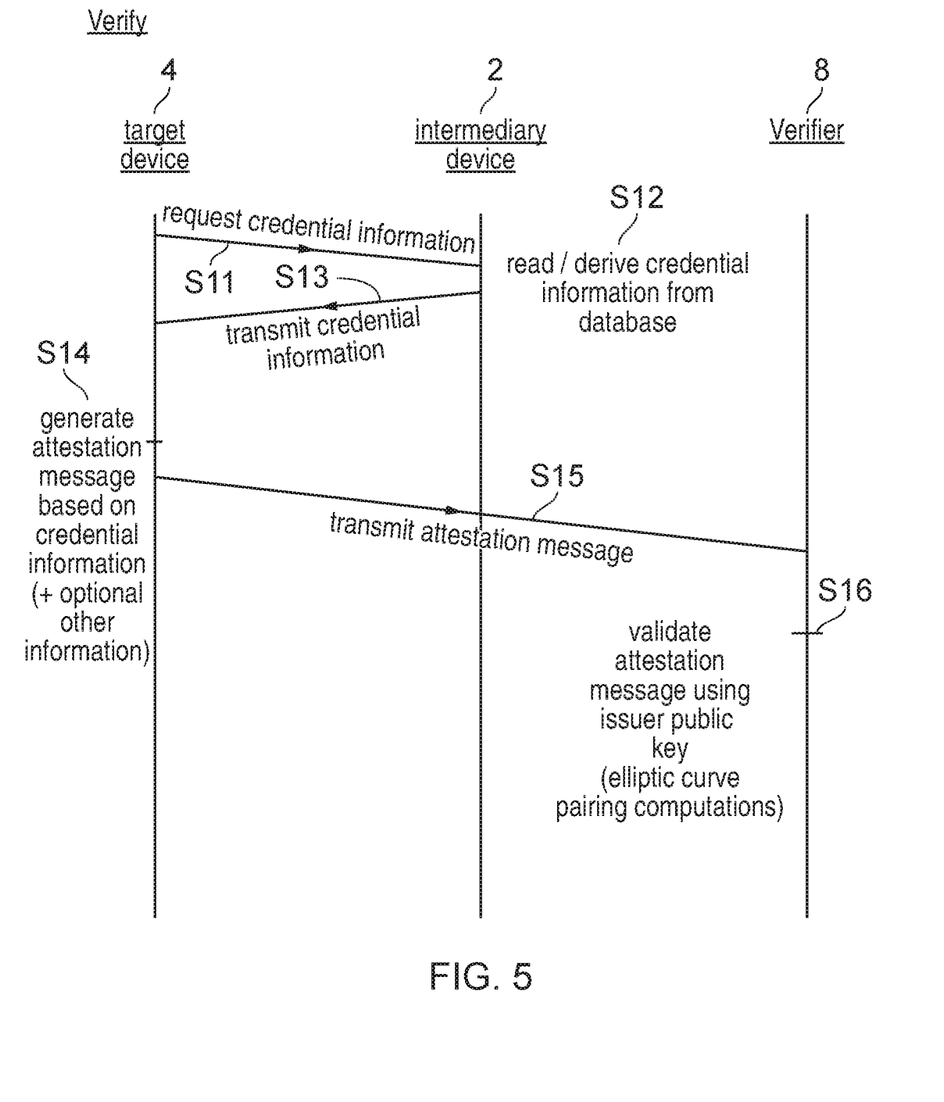
FIG. 5 shows a method of using the credential to attest to a verifier that the target device meets a given property.

FIG. 5 shows a method for performing the verify phase of the anonymous attestation cryptographic protocol. FIG. 5 shows the messages exchanged by the target device 4, intermediary device 2 and the verifier server 8. At step S11 the target device 4 requests credential information from the intermediary device 2. For example the target device 4 may provide its device ID and the issuer ID of the relevant credential, and then at step S12 the intermediary device 2 may lookup the credential information for that device and issuer in the database. The credential read from the database may then be returned to the target device at step S13, or alternatively the credential read from the database may be processed and some information derived from that credential may be transmitted. Hence the credential information transmitted from the intermediary to the target device 4 may be either the original credential or some derivative of that credential.

At step S14 the target device 4 generates an attestation message based on at least the credential information and device-bound secret $K_{seed}$, and optionally based on other information in addition to the credential and secret. For example, the message may also include an optional basename parameter which may control the extent to which the device can be identified as member of a given group of devices. For example different basename parameters may control different levels of linkability between certain groups of devices. The message may also include other information relevant to the particular application for which the device is being used, for example with access to a banking service then bank account details or other information could be included in the message. Alternatively such application-specific information may be transmitted in separate messages once the attestation is completed. At step S15 the target device 4 transmits the attestation message to the verifier 8 (either directly or via the intermediary device 2). At step S16 the verifier 8 validates the attestation message using a public key provided by the issuer 6. Again, the validation of the signature on the attestation message using the issuer public key may use elliptic curve pairing computations which may be relatively processor-intensive. For the verifier 8, this will be typically be implemented on a server and so the processing load may not be a significant problem.

Hence, with the protocol shown in FIGS. 4 and 5, a privacy-preserving protocol can be separated into a computationally expensive part S7 for validating the credential which does not require access to the secret data $K_{seed}$ or $K_{pr}$ held by the target device, and a computationally simpler part S3 which processes the sensitive secret data, between two separate consumer electronics devices 4, 2 communicating via a relatively simple protocol. It also provides a centralised anonymization service for Internet of Things devices which belong to a single entity which are mutually untrusting and need to provide direct anonymous attestation to different servers.

One example of a DAA protocol which could be used for the present technique is the protocol described in Bernhard, David, et al. "Anonymous attestation with user-controlled linkability." International Journal of Information Security 12.3 (2013): 219-249. Hence, the portions of this protocol which require processing of the secret held by the device can be implemented on the target device 4 itself, while the portions of the protocol which validate the credential received from the issuer 6 using elliptic curve pairing calculations can be performed on the intermediary device 2. It will be appreciated that this is just one example of a protocol which can be adapted as discussed above, and other DAA protocols could also be used. In summary, this technique enables anonymous attestation protocols to be used in lower power devices than would otherwise be practical given the limitations on processing resource available in such devices.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method for obtaining a credential for attesting to a predetermined property of a target device according to an anonymous attestation cryptographic protocol; the method comprising:
   requesting, by the target device, authentication of the target device by an issuer in dependence on secret information held by the target device;
   receiving, at an intermediary device from the issuer, the credential provided by the issuer when the authentication is successful, wherein the intermediary device is a separate consumer electronics device to the target device; and validating the credential provided by the issuer to the intermediary device at the intermediary device according to the anonymous attestation cryptographic protocol, wherein responsive to a positive validation of the credential by the intermediary device, the credential or information derived from the credential is used by the target device to generate an attestation message transmitted to a verifier to attest to the verifier that said target device has said predetermined property.

2. The method of claim 1, comprising storing the credential at the intermediary device when the credential is validated.

3. The method of claim 2, wherein the intermediary device stores credentials for attesting to properties of a plurality of different target devices.

4. The method of claim 2, wherein the intermediary device stores credentials issued by a plurality of different issuers.

5. The method of claim 1, wherein the intermediary device has greater processing resource than the target device.

6. The method of claim 1, wherein the validation of the credential at the intermediary device comprises at least one elliptic curve pairing computation or comparison.

7. The method of claim 1, wherein the anonymous attestation cryptographic protocol comprises a Direct Anonymous Attestation protocol.

8. A non-transitory, computer-readable storage medium storing a computer program for controlling a data processing apparatus to perform the method of claim 1.

9. A system comprising:

a target device to store secret information for authenticating the target device to an issuer and to request authentication of the target device by the issuer in dependence on the secret information;

an intermediary device to receive from the issuer a credential for attesting that the issuer has authenticated the target device as having a predetermined property, and to validate the credential received from the issuer according to an anonymous attestation cryptographic protocol, wherein the intermediary device is a separate consumer electronics device to the target device; and a verifier to receive, from the target device and responsive to a positive validation by the intermediary device of the credential received by the intermediary device from the issuer, an attestation message to attest to the verifier that said target device has said predetermined property, the attestation message generated using the credential or information derived from the credential.

* * * * *